United States Patent [19]
Lindörfer et al.

[11] 4,435,290
[45] Mar. 6, 1984

[54] PROCESS FOR THE TEMPORARY STORAGE OF RECYCLABLE LIQUID WASTES IN UNDERGROUND SALT CAVERNS

[75] Inventors: Walter Lindörfer, Kassel; Wilhelm Jan-Held, Staufenberg, both of Fed. Rep. of Germany

[73] Assignee: Wintershall AG, Kassel, Fed. Rep. of Germany

[21] Appl. No.: 425,900

[22] Filed: Sep. 28, 1982

[30] Foreign Application Priority Data

Oct. 22, 1981 [DE] Fed. Rep. of Germany ....... 3141885

[51] Int. Cl.$^3$ .............................................. C02F 1/66
[52] U.S. Cl. .................................... 210/708; 210/710; 210/712; 210/721; 210/747; 210/912; 210/919; 405/53
[58] Field of Search ............... 210/747, 712, 708, 721, 210/722, 912, 919, 800, 804–806, 170, DIG. 1, 710, 774, 720; 405/52, 53

[56] References Cited

U.S. PATENT DOCUMENTS

| 3,491,540 | 1/1970 | Lennemann | 405/53 |
| 3,575,854 | 4/1971 | Richards | 210/720 |
| 3,617,562 | 11/1971 | Cywin et al. | 210/722 |
| 3,738,932 | 6/1973 | Kostenbader | 210/919 |
| 3,817,859 | 6/1974 | Tate | 210/747 |
| 3,887,462 | 6/1975 | Lagess et al. | 210/747 |
| 3,914,945 | 10/1975 | Bietlot | 405/53 |

FOREIGN PATENT DOCUMENTS 130229 3/1978 Fed. Rep. of Germany ........ 405/53

Primary Examiner—Benoit Castel
Attorney, Agent, or Firm—Michael N. Meller

[57] ABSTRACT

Salt caverns or cavities are used only for intermediate storage and not for permanent storage of liquid pumpable wastes, to avoid above ground installations for such operations as phase separation, neutralization and sedimentation. The caverns may be used in combination or in series.

21 Claims, No Drawings

PROCESS FOR THE TEMPORARY STORAGE OF RECYCLABLE LIQUID WASTES IN UNDERGROUND SALT CAVERNS

FIELD OF THE INVENTION

This invention relates to the use of underground salt caverns and cavities as huge reactors for the treatment of industrial wastes. More particularly, there is disclosed the use of one, several or a series of such caverns for the treatment, processing and temporary storage of such materials underground.

BACKGROUND OF THE INVENTION

From large scale industrial processes, especially those employing chemical treatment or reactions, there can accumulate large amounts of liquid wastes, the treatment of which in many cases, is a burdensome technical expense. According to known processes for the treatment of, for example, oil-containing wastes, after an appropriate prior phase separation of any entrained water, such wastes are burned in order to produce energy. Such a phase separation is therefore expensive from a technical standpoint since in most cases a large liquid volume must be treated and the aqueous phase is separated which still contains about 1 to 4 mg/l of oil phase.

The remaining amounts of the oil phase must be removed from the aqueous phase, before the latter can be discharged into natural waters through drainage ditches. The burning of this oil phase produces exhaust gases containing metal salts therein, including where converted into the corresponding oxides, and spewed into the surrounding air thus harming the environment. Moreover, the additional burdens on the environment from the carbon dioxide or sulfur dioxide produced during burning of the oil phases, separated from wastes can be avoided only at still further technical expense.

The burning of waste products in which halogen-containing hydrocarbons are present, leads to the formation of hydrogen halide-containing waste gases which must be absorbed at considerable technical expense before their release into the atmosphere. The same applies to the formation of unwanted salt solutions which, in turn, must either be treated or transported to the sea.

Acid wastes, such as, for example, dilute acids containing iron sulfate, the so-called green salt, were formerly discharged into the sea resulting in a change in pH value and the undesirable formation of carbonates. The appropriate treatment of these dilute acids can be accomplished only at considerable technical expense and ultimately leads to products which must still be disposed of. To do this, the waste dilute acids which are mostly in the form of emulsions or sludge, are treated with emulsion-breakers and the solids which separate out are separated from the liquid phase by filtration. The resulting residues can then be burned, but care must also be taken that all harmful substances are removed from the resulting exhaust gases before they are discharged into the atmosphere. The separated liquid phase must then, for example, be separated by distillation into an organic concentrate and water. The organic concentrate is burned while the water can first be passed through a layer of solid absorbent before being discharged into a sewer. The spent absorbent must finally be disposed of.

For example, it should be emphasized that by these technologies about 700,000 tons per year of dilute acid with 250,000 tons per year of iron sulfate as well as 35,000 to 90,000 tons per year of halogenated hydrocarbons, have to be removed in a way which is least harmful to the environment. As already mentioned, there is a considerable expenditure of apparatus, plants and energy necessary if pollution of the environment is to be avoided. The same is also true for other pumpable technological wastes.

Furthermore, German published application No. 21 56 315 discloses the storage of wastes in open lagoons after they have been provided with a water-tight and, if necessary, a gas-tight coating. These coatings which consist of bituminous substances or emulsions of plastics in water, and which are poured out in liquid form on the previously solidified bottom of the lagoons and hardened there, can leak due to structural influences so that even with these processes, effects which are harmful on the environment can not be avoided altogether.

There has also been previously proposed a process for the terminal storage of pumpable wastes according to which these liquid wastes are discharged which crystallize at the cavern temperature with the bonding of water of crystallization, or with organic materials which solidify in the liquid phase of the cavern contents or increase their density; or with solids, whereafter the cavern is sealed. The object of this process is to compensate as much as possible for the convergence of the salt cavern by increasing the density of the liquid phase of the cavern contents.

The goal of maintaining a pure environment and also saving raw materials by waste management cannot be achieved for special wastes, which contain in part a high portion of valuable materials, without eliminating the possibility of later recovery involving high technological effort and cost. The task of technology should rather be to treat and store these special wastes so that they can be recovered and utilized providing the highest possible yield. Some of these wastes can already be recycled. For most of the accumulating wastes this possibility has not existed as yet because of the economically non-recoverable treatment costs.

According to the present state of the art, solid wastes are disposed of in abandoned salt mines. After delivery to containers, these are transported underground, removed to salt tunnels and walled in. As far as depositing liquid wastes in abandoned salt mines, only the puddling of the shaft installation is required, which, formerly according to mining laws had to take place with brine. This present practice in the art indeed avoids the above ground treatment of these solid wastes and disposal or elimination by burning or dilution in the sea, but the recovery from the solid deposits is beset with considerable technical effort and costs and is not possible for liquid wastes, if additives are necessary for their solidification.

The state of the art has therefore not moved in the direction of the technically simple phase separation and creation of the technological possibility for recovering wastes for recycling but has as its object the disposal in the sense of terminal storage of such wastes.

In addition, it is known to store petroleum or natural gas in large amounts in salt caverns for re-use. German Patent No. 21 26 823 describes in this connection a process for storage and recovery of gases which are soluble in hydrocarbons. Methane is dissolved in oil utilizing the pressure of the salt water columns which are present above them. The gas is separated from the liquid mixture by expansion in arbitrary cycles and the oil pumped back. This process therefore utilized underground storage in salt deposits for the absorption of gases in hydrocarbon oils and avoids large space containers above ground. This state of the art deals with organic materals, which do not undergo any reaction with the rock salt of the deposit. A homogeneous liquid phase is formed in the deposit with small increase in volume from which the stored phase is recovered by expansion. The oil used as the storage medium is a gas-free fraction of crude oil.

This process is therefore not concerned with any of the several wastes having dissolved substances in the aqueous phase; with an emulsion or suspension of aqueous and oil-containing phases with an arbitrary amount of dissolved or suspended materials such as metal salts; organic compounds; solid sludge of finely divided hydroxide or crystallizates or solid residues.

The gases, such as natural gas, which are recovered by expansion according to the state of the art can be conveyed directly for use as an energy carrier.

Further according to the state of the art, radioactive wastes are deposited underground and terminally stored in mined caverns of salt deposits.

German Patent Publication No. 2 225 664 discloses a process for the deep storage of liquid or oozable radioactive, poisonous wastes. Accordingly, these wastes are mixed above ground with cement or bitumen and "salt gravel" to form a slurry and then pumped into the salt cavern. There the slurry sets up and forms a solid mass. Also according to this process the deposited slurry is converted to an irreversible solid form as a terminal deposit. The depletion of the walls of the salt cavern is prevented by the addition of the crystallized rock salt, the so-called salt gravel. This crystallization quickly dissolves due to its large surface area and converts an unsaturated, aqueous phase into a saturated solution. This state of the art therefore does not teach any recycling of wastes, but is only directed towards terminal storage in salt caverns. This process does not teach the utilization of the dissolving capacity of aqueous solutions for the enlargement of the volume of salt caverns and by this an increase in the storage capacity for wastes, but on the contrary, the prevention of this by the introduction of added crystallizates in the form of salt gravel.

The state of the art has therefore only moved in the direction of the intermediate storage of pure materials or the terminal storage of wastes, which are walled in or solidified.

The teachings of German Patent No. 25 49 313 lead in a similar direction. Accordingly, liquids, especially non-polar intercalation materials are terminally stored in salt caverns and then covered with a gas-tight and water-tight coating. Such a medium consists of a mixture of styrene with cyclohexanone peroxide and cobalt accelerators, which harden in the caverns. The coating can also consist of a mixture of polyisobutylene with additions of polyisoprene and/or polybutadiene. The layer of synthetic material thus formed in the salt cavern should exhibit a certain elasticity against solid materials which might fall thereon, so that mechanical harm to the synthetic material layer is largely avoided.

The process of the invention does not require such coatings which hinder the phase separation and recycling of aqueous or oil-containing phases or the finely divided solid materials contained therein.

In view of the considerable effort involved in the known processes for treatment of liquid wastes from chemical processes and in order to safely avoid harm to the environment, the task is rather to find a way to store and treat such wastes in the simplest possible manner which will require little expense and will permit recovery of the valuable materials contained in these wastes without causing harm to the environment by the storage of these wastes.

SUMMARY OF THE INVENTION

A process has been found for the temporary storage and treatment of completely or partially recyclable liquids in underground salt-enclosed cavities which are equipped with pipelines for filling and empyting. According to this process a. Liquid, pumpable wastes, which may contain solids, are introduced into the cavities, whereby their acid constituents are neutralized before, during or after the introduction;

b. the stored wastes are allowed to stand for a sufficient time to separate the components of lower specific gravity from those of higher specific gravity;

c. the overlying phase of lower specific gravity is pumped away until the surface of the phase of higher specific gravity is reached for further treatment;

d. the heavy metals which may be present in the phase of higher specific gravity are mixed with alkaline reacting solids or dissolved inorganic compounds;

e. after a standing time sufficient for the precipitation of the heavy metal precipitate, the overlying, salt solution, which is free of heavy metals, is pumped away until the surface of the sediment is reached and f. the process steps a. through e. are repeated in the same or a different order.

The process of the invention makes use of the salt caverns resulting from the removal of brine in a conventional way from rock salt deposits or the cavities resulting from the production of crude potassium salts and rock salt deposits for the storage of liquid, pumpable wastes.

The repetition of the use of caverns or cavities according to the process of the invention also avoids the above ground establishment of dumps or other storage means and additionally makes use of the technically and economically advantageous possibility of enlarging the volume of the caverns or cavities by partial dissolving of the surrounding salt casing as well as the re-treatment of the separated phases of the wastes by recycling.

DETAILED DESCRIPTION OF THE INVENTION

According to the invention in the first step, the liquid pumpable wastes or their mixtures as a neutral or above ground neutralized phase are introduced into the salt cavern or cavity according to the amount collected, whereby their acid components can also be neutralized either during or after introduction, for example by mixing or applying an alkaline liquid or a solid.

The thus stored wastes are then allowed to stand for a period of time sufficient to separate the phase having the lower specific gravity, especially an oil phase, from the phase having the higher specific gravity. The overlying phase having a lower specific gravity is pumped away until the surface of the phase having the higher specific gravity is reached and a further treatment to obtain valuable products is carried out. For this, the lighter phase can be split up into its components, for example by distillation, which is especially suitable if this phase consists of hydrocarbons including petroleum constituents. At the same time, during the settling time any solid materials present in the stored liquid and/or forming crystallates and/or solid reaction products sink into the lower space of the cavern or cavity and collect in the phase having a higher specific gravity, preferably an aqueous phase. During the settling time, the unsaturated aqueous solution in the phase of higher specific gravity becomes saturated until an equilibrium is established with the salt of the walls of the cavern or cavity, whereby this solution enlarges the volume of the cavern or cavity because of the natural heat of the cavern or cavity and thereby forms additional storage space.

Finally in a subsequent step, heavy metals which may be present are precipitated from the aqueous phase by adding dissolved or solid alkaline materials. After maintaining a standing time which is sufficient for the sedimentation of the resulting precipitate, the overlying salt solution, which is substantially free of heavy metals, is pumped away down to the surface of the sediment and is then further treated according to known methods to recover technically valuable products, such as, for example, inorganic salts. In case such a treatment is not to be carried out, this salt solution can also be led into the sea without harming its ecology.

The pumping of liquids from the salt caverns or cavities filled according to the invention can be carried out in one or more steps.

The previously mentioned process steps can be repeated in this or any other order.

The process of the invention can be changed so that the liquid pumpable wastes are pumped into the upper volume of the salt cavern and simultaneously a corresponding amount of salt solution is pumped out of the lower volume and passed into the sea, in order to minimize convergence in the salt caverns which are completely or partially filled with salt solution.

In order to increase the useful life of the salt cavern or cavity in the sense of this invention, it is possible to pump out the sediment which forms in the aqueous phase, i.e. the phase of higher specific gravity, together with the liquid or part of the liquid, to separate the aqueous phase therefrom, to concentrate the resulting solid-liquid phase further and to carry out a treatment to recover technically valuable materials, especially metals or their salts. The remaining aqueous phase can be discharged into the sea or put back again into the salt cavern or cavity. According to this variant of the process of the invention, it is, for example, possible to pump out precipitated sediments of the hydroxides of metals such as Pb, Cu, Zn, Mo, Cd as aqueous suspensions, to filter them off above ground, then to further dewater them by centrifuging to treat the moist material, while the salt solution which is practically free of said metals is discharged into the sea or entirely or partially conducted back into the cavern.

The liquid phase of the waste being introduced into the salt cavern or cavity can be lowered in viscosity for instance by heating, such as possibly by utilizing the heat of neutralization and thus be made easier to pump. These steps are of particular use with wastes having bituminous components.

In other cases, it can be useful for carrying out the process of the invention to heat up the liquid phase which is or contains a saturated salt solution to such an extent that an unsaturated solution is formed. Thus crystallization, upon reaching the saturation level is avoided. Such a crystallization can lead to undesirable adherence to the pipelines and other transporting means which can cause considerable narrowing of the pipe cross section and harm the pumping apparatus. The temperature of the heated solution drops after being brought into the pipelines surrounded by the mounds of earth in the caverns or cavities to the surrounding temperature which, due to the natural warmth of the earth, is in any case higher than the temperature above ground.

Crystallized or finely divided solid, non-sticking wastes can also be added to the liquid or liquid phase of the waste to be stored in amounts which do not affect the pumpability of the resulting mixture. The particle size of these solid materials must in each case be smaller than the diameter of the filling pipe that leads to the cavern or cavity.

It can also be advantageous to first add alkaline, liquid or solid-liquid wastes to the salt caverns or cavities to neutralize the later added acid wastes, since the latter uncontrollably corrode the salt walls of the cavern or cavity.

If the liquid waste to be stored according to the invention consists of unsaturated aqueous solutions, such as spent acids, phosphate sludge or dilute acid, their water content can be utilized to enlarge the volume of the salt cavern or cavity.

The liquid wastes to be stored according to the invention can also be mixed with pasty or bituminous wastes, but only in such amounts that the mixture remains pumpable. These mixtures are advantageously introduced into the cavern or cavity at such a rate that sticking on the pipe walls cannot occur.

It can also be advantageous if the filling volume of the salt cavern or cavity only amounts to 50 to 66% of the total volume. In this manner, the enlargement of the volume which occurs due to the warming of the liquid wastes by the heat of the earth can be compensated for and in addition a gas space is provided in the cavern or cavity in which any gaseous phase present can collect.

For the storage of liquid, pumpable wastes according to the invention two or more salt caverns or cavities next to each other in the salt deposit can be used and in one cavern or cavity organic liquid-containing wastes for recovery of the organic phase after gravity separation are introduced and in another salt cavern or cavity the oil-free waste is introduced, the neutral phase is introduced into one salt cavern or cavity and the alkaline or acid phase to be neutralized is introduced into another salt cavern or cavity. Included in the organic liquid-containing liquid wastes are also oil-containing wastes which are not burned because they are difficultly separable and/or contain only small amounts of oil and/or contain difficultly separable metal impurities. By the salting out of such wastes with the salt of the cavern or cavity walls, the organic liquids are salted out and collect over or under the aqueous phase. In this way, aqueous emulsions can be separated entirely conventionally whereby anionic surface-active substances can be added as a separating aid for the emulsion. The separated emulsified phase can then be drawn out of the cavern or cavity.

There is also the possibility of filling two or more salt caverns or cavities in the salt deposit with wastes in combination with each other and to empty out and pump sediment such as crystallizates, salts, hydroxides from one salt cavern or cavity into another salt cavern or cavity and only build up a solid volume in one cavern.

The process of the invention has the advantage that the salt caverns or cavities are not used as terminal storage places for liquid, pumpable wastes but as separation installations for treatment of such material systems over a longer period of time.

The salt caverns produced by removal of brine from rock salt deposits have as a rule a length of about 600 to 700 m, calculated from the end of the casing shoe to the bottom brine, a volume for filling the same of 300,000 to 500,000 m$^3$. Several caverns next to each other or in a circular arrangement can be worked. The advantage of this is that each salt cavern can be used for certain wastes having different properties. But the advantages of a compound system can also be utilized.

Where vertical or sloping cavities in abandoned potash mines are available, their capacities can be used for carrying out the process of the invention. There is the advantage that these, up until now unused spaces, are now put to a meaningful use. There is the further advantage that liquid wastes with a water capacity, preferably suspensions and emulsions, can be saturated in their unsaturated aqueous phase in the salt cavern until an equilibrium is established. Thus the storage capacity is increased. If the saturation can proceed practically to the maximum of 330 g/l, then with the practical dissolving of 1 t of NaCl in 4m$^3$ of water in a salt cavern with a volume of 300,000 m$^3$, one can calculate a volume increase of about 37,000 m$^3$, corresponding to about 12 vol. % per filling.

A further advantage consists in that the liquid wastes take on the temperature of the deposit in the salt cavern or cavity.

The temperature of the deposit is around 50° to 60° C. depending upon the depth of the cavern in the deposit. Thereby the take-up capacity for salt increases in proportion to the small, to be sure, temperature coefficient of the solubility.

There is the further advantage that the saturation with sodium chloride increases the specific gravity of the aqueous phase and thereby the gravity separation of the organic liquid is accelerated by the large difference in specific gravity.

In addition, the viscosity of the oil phase is lowered by the rise in temperature and thereby the energy expended in pumping out the organic phase is decreased.

There are therefore advantages in disposal in salt caverns according to the invention by utilizing the heat energy of the deposit. These exist therefore because the caverns or cavities are filled and emptied several times. By increasing the specific gravity of the aqueous phase, the sediment volume of solid materials, such as sludge or crystallizates, is decreased in the aqueous phase and the content of solid materials increased. There is a quick separation and sedimentation, especially because of an increase in temperature. Further, in pumping out of the aqueous phase, a phase mixing is aggravated.

It is generally expedient to take into account while pumping, the "mixing zone" between the upper phase of lower specific gravity and the aqueous phase. The same applies with respect to this and the solid phase, as a limiting layer and not to pump out above or below this layer in order to pump out only pure phases in practice.

The process of the invention has the economically important advantage that the upper phase of lower specific gravity remains available for treatment or energy utilization by recycling. Further, the separation of the almost saturated or substantially so aqueous phase after precipitation of any heavy metals as hydroxides or carbonates, provides the advantage that the salt caverns or cavities are not burdened with a large volume of such aqueous phase. This is especially so of suspensions and emulsions and these volumes remain available for the deposit of additional wastes after pumping out the separated aqueous phase. Inasmuch as known emulsion breakers must be added for difficultly or only slowly separating emulsions, their specific requirement and therefore the requirements for the separation are decreased by the effect of saturation of the aqueous phase. Inasmuch as neutralization of acid wastes in order to avoid formation of hydrochloric acid by reaction with the rock salt of the salt cavern takes place in the salt cavern or cavity, the underground temperature is more quickly reached and the saturation speeded up thereby.

There is practically no danger of raising the temperature too much so that steam is formed, since the ground has good heat conductivity and serves as a buffer for the heat capacity. The speed of phase separation can also be controlled in test experiments above ground. A further advantage of the process of the invention lies in that the settling sludge can be recovered by pumping out the solid-liquid phase, if there is technical or economic interest therein.

In another embodiment, the process of the invention offers the possibility of also using salt caverns or cavities filled with aqueous solutions for the deposit of liquid, pumpable wastes. It is only necessary to pump out the corresponding amount of aqueous salt solution in order to maintain the volume.

Another advantage of the process of the invention resides in that solid substances, especially crystals from by-products occurring in fairly large amounts, can be added without difficulty to the liquid phase in an amount so as to maintain the pumpability. This amount can be quickly determined in a model test.

There is moreover the technical advantage that liquid phases of differing viscosities, especially those with low water content and a higher portion of sludge or even pasty wastes, can be employed as a pre-mixture in order to attain pumpability. This pumpability can be attained by heating the mixture and also by the utilization of the heat of neutralization or reaction before the introduction into the salt caverns or cavities.

A further advantage resides in that the solid materials such as plastic wastes or cuttings, after reduction in size to a length less than for instance the diameter of the filling pipe, e.g., to 8⅝" or 202 mm, can be added to the liquid phase of the waste. Thus, the possibility of clogging is prevented.

In employing this option of mixing solid wastes with the liquid pumpable wastes, the expensive solidification and packing as well as the separate underground transport through shaft installations is avoided. Instead gravity flow is used for this transport after the mixing, in order to save technical effort and energy.

As far as mixing in sticky wastes is concerned, special care must be taken for determining the amount to be added in order to avoid sticking to the walls of the filling pipe.

The process of the invention therefore offers, through the repetitive use of the capacity of the salt caverns or cavities in salt deposits, the possibility for the first time to utilize these large scale technical separation installations without the need for erecting large above-ground containers. Moreover, there is the possibility of advantageously utilizing the heat capacity of the bed, as well as the special advantage of considering these deposits for liquid wastes, as reservoirs for valuable raw materials.

A general advantage of the process of the invention is that only small units are needed above ground such as for mixing of certain wastes and possibly for neutralization. There are therefore no visible dumps for separated solids or solidified liquid phases from wastes.

Wherever salt deposits are found in coastal regions, there are no technical difficulties involved in leading the resulting salt solutions into the sea as substantially heavy metal-free solutions.

The process of the invention is therefore best carried out where no long pipes are required. This can also be the case where empty mine installations from disintegrating mine shafts are available.

EXAMPLES

In an effort to set forth in examples the nature of the invention, several above-ground experiments were run, since it is very difficult to give more or less exact measurements of components, readouts, etc. when dealing with the huge volumes of the salt caverns. Thus in the following examples, the results of such pilot plant-type studies are set forth.

Example 1

An above ground salt mine was constructed having the size of about 0.8 $m^3$ and which has been finished by grinding to have equal and smooth surfaces, with both the top and bottom sides so that the resulting surfaces are parallel. This above ground salt mine has in the center, a cylindrical recess or cavity formed with a diameter of about 16 centimeters and a volume of about 10 liters. Such a recess or cavity serves as the model for the charging of the liquid waste materials according to the process of the present invention.

There is first charged from a tossing tub, under agitation, an aqueous slurry of a mixture consisting of CaO—Ca(OH)$_2$ having a CaO content of about 25 to 30% by weight and having a volume of about 4 liters in the liquid phase.

There is then introduced into this alkaline phase with agitation about 2 liters of a mixture comprising acid slurry resulting from the dye and pigment manufacturing with a content of 9% $H_2SO_4$; 5% $FeSO_4$; 5% inorganic solid slurry components and 0.4% heavy metals (Mn, V, Cr, Ti) having a density of 1.2 g/l and a boiling point of 115° C.

Since the liquid phase has insufficient acidity the mixture will become heated through the neutralization of the waste material along with a precipitation of the $CaSO_4$ in the form of dihydrates and of the hydroxides of the heavy metals.

The solid materials as well as the components of the slurry then undergo a sedimentation during a rest period of about 48 hours. In addition, a saturation of the aqueous solution with NaCl dissolved from the walls takes place thus increasing the volume of the recessed cavity.

The resulting salt solution having about 20 g/l of dissolved NaCl in it is then pumped off until the top line of the sedimentation layer is reached. This salt solution will thereafter be thinned practically free of any heavy metals and led away to the sea where it becomes diluted by the sea water.

The solution remaining in the sediment layer is further saturated with NaCl until a balance of about 220 g/l is obtained. The sediment and the waste materials which have been reacted previously with the alkaline mixture and its resulting precipitation products will lead to a stabilization of the recess of the cavern which, in practice, will prevent a convergence of same. As a result of the excess alkalinity of this mixture, additional acidic waste materials are added and, following the reaction of the materials with a subsequent sedimentation, a pumping-off of the aqueous neutral solution layer can be repeated. As a result of the immediate neutralization of the waste materials during the slow pumping-in process into the prepared aqueous phase, the formation of the HCl from rock salt is prevented.

The sediment layer is then pumped away for permanent storage elsewhere. The heat produced during the neutralization process, in practice, is taken up through the conductivity of the rock salt and also aids in the pumpability of the sediment.

Example 2

The above ground salt mine of Example 1 served as the cavern for this Example. Two liters of an oil emulsion derived from metal processing industry waste was employed. It had a water content of about 85%; a density of 0.97 g/cm$^3$/18° C., as well as a pH value of 8.0; a boiling point above 100° C.; and a flash point over 70° C. with said emulsion being pumped at a viscosity of 8 cp/20° C. The resulting mixing with the remaining volume of the liquid left over from Example 1 is further enriched with NaCl producing a cracking or splitting of the emulsion in a short time without the need for an emulsion cracker.

The resulting aqueous phases will then both mix together, with a decrease in the NaCl content of the formed aqueous solution resulting in a value of 40–60 g/l of NaCl. The split-off oil phase, because of its low specific weight, settles on top of the aqueous phase. After a 5 day rest period for phase separation, the aqueous phase between the oil phase and the top line of the sedimentation volume is partially pumped off.

A further 1.5 liters of the waste oil emulsion is then charged into the cavern with the process steps repeated. The addition of 1.5 to 2 liters of waste oil emulsion is repeated until following the pumping off of the aqueous layer, sufficient depth of oil is produced, so that it too may be recovered.

Finally, the sedimentation layer is also pumped off to be then permanently stored in an appropriate storage cavern.

While this invention has been illustrated and described in connection with certain preferred embodiments thereof, it will be apparent to those skilled in the art that the invention is not limited thereto. Accordingly, it is intended that the appended claims cover all modifications which are within the true spirit and scope of the invention.

We claim:

1. A process for temporary storage of recyclable pumpable liquid waste in an underground salt-enclosed cavern, which is provided with pipelines for filling and emptying, comprising the steps of:
   (a) introducing said liquid waste into said cavern;
   (b) neutralizing acid components in said liquid waste before, during or after step (a);
   (c) allowing said neutralized liquid waste to stand in said cavern in order to separate into two liquid phases of differing specific gravities; and
   (d) pumping out the phase having the lower specific gravity leaving the phase with the higher specific gravity.

2. The process of claim 1, further comprising the steps of mixing the phase having the higher specific gravity with an alkaline reagent or solution of an inorganic compound in order to form a heavy metal precipitate, allowing the mixture to settle, and pumping out the salt solution free of heavy metals that forms the lighter phase.

3. The process of claim 2, wherein a second amount of liquid waste is introduced into the cavern containing the higher specific gravity phase from step (d), and steps (b) through (d) are repeated.

4. The process of claim 2, wherein the salt cavern contains a salt solution and the liquid waste is introduced above said solution while a corresponding amount of salt solution is pumped out from the bottom of the cavern, thereby minimizing convergence of the salt cavern.

5. The process of claim 2, wherein the liquid waste is an unsaturated solution which dissolves salt from the walls of the cavern thus enlarging the cavern.

6. The process of claim 2, further comprising the step of adding a pasty or bituminous waste to said liquid waste in an amount so as to maintain the pumpability of the liquid waste and introducing the wastes into the cavern at a speed which will prevent adherence of the wastes to the filling pipeline.

7. The process of claim 2, wherein the liquid waste is introduced into the cavern until about 50 to 66% of the volume of the cavern is filled.

8. The process of claim 2, wherein a plurality of caverns are employed in combination, parallel or in series.

9. The process of claim 1, wherein a second amount of liquid waste is introduced into the cavern containing the higher specific gravity phase from step (d), and steps (b) through (d) are repeated.

10. The process of claim 1, wherein the salt cavern contains a salt solution and the liquid waste is introduced above said solution while a corresponding amount of salt solution is pumped out from the bottom of the cavern, thereby minimizing convergence of the salt cavern.

11. The process of claim 1, wherein the liquid waste contains an aqueous phase, and further comprising the steps of pumping out the phase of higher specific gravity from step (d), separating a second aqueous phase from said sediment to leave a solid-liquid phase, concentrating said solid-liquid phase and recovering valuable substances therefrom, and disposing of both aqueous phases at sea or returning them to the salt cavern.

12. The process of claim 1, further comprising the step of heating the liquid waste prior to introduction into the cavern.

13. The process of claim 1, further comprising the step of adding non-caking crystalline or finely divided solid wastes to the liquid waste in an amount so as to still maintain the pumpability of the liquid waste.

14. The process of claim 13, wherein the solid wastes have a particle size less than the diameter of the filling pipeline.

15. The process of claim 1, wherein liquid or solid-liquid alkaline wastes are first introduced into the cavern to neutralize subsequently added acid wastes.

16. The process of claim 1, wherein the liquid waste is an unsaturated solution which dissolves salt from the walls of the cavern thus enlarging the cavern.

17. The process of claim 1, further comprising the step of adding a pasty or bituminous waste to said liquid waste in an amount so as to maintain the pumpability of the liquid waste and introducing the wastes into the cavern at a speed which will prevent adherence of the wastes to the filling pipeline.

18. The process of claim 1, wherein the liquid waste is introduced into the cavern until about 50 to 66% of the volume of the cavern is filled.

19. The process of claim 1, wherein said liquid waste is an aqueous emulsion and is allowed to remain in the cavern until the aqueous phase of the emulsion becomes saturated with salt from the cavern walls thereby breaking the emulsion.

20. The process of claim 19, wherein anionic surface-active agents are added to the emulsion.

21. The process of claim 1, wherein a plurality of caverns are employed in combination, parallel or in series.

* * * * *